US007693267B2

(12) United States Patent
Howell et al.

(10) Patent No.: US 7,693,267 B2
(45) Date of Patent: Apr. 6, 2010

(54) PERSONALIZED USER SPECIFIC GRAMMARS

(75) Inventors: David Andrew Howell, Seattle, WA (US); Sridhar Sundararaman, Bellevue, WA (US); David T. Fong, Seattle, WA (US); Frank Torsten Bernd Seide, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1133 days.

(21) Appl. No.: 11/324,208

(22) Filed: Dec. 30, 2005

(65) Prior Publication Data

US 2007/0153989 A1    Jul. 5, 2007

(51) Int. Cl.
*H04M 11/00* (2006.01)
(52) U.S. Cl. .................................. 379/88.14; 379/88.01
(58) Field of Classification Search .............. 379/88.14; 704/209; 455/414.4
See application file for complete search history.

(56) References Cited

U.S. PATENT DOCUMENTS

| 5,381,466 | A | 1/1995 | Shibayama et al. |
| 5,712,901 | A | 1/1998 | Meermans |
| 5,712,903 | A | 1/1998 | Bartholomew et al. |
| 5,732,126 | A | 3/1998 | Fitzpatrick et al. |
| 5,943,398 | A | 8/1999 | Klein et al. |
| 6,085,231 | A | 7/2000 | Agraharam et al. |
| 6,188,985 | B1 * | 2/2001 | Thrift et al. ................. 704/275 |
| 6,198,808 | B1 * | 3/2001 | Martin ..................... 379/88.14 |
| 6,499,021 | B1 * | 12/2002 | Abu-Hakima ................. 706/10 |
| 6,687,508 | B1 | 2/2004 | Dwyer et al. |
| 6,775,360 | B2 | 8/2004 | Davidson et al. |
| 6,816,578 | B1 | 11/2004 | Kredo et al. |
| 6,829,607 | B1 | 12/2004 | Tafoya et al. |
| 2002/0110248 | A1 * | 8/2002 | Kovales et al. ................. 381/56 |
| 2002/0178005 | A1 * | 11/2002 | Dusan et al. ................. 704/254 |
| 2003/0126216 | A1 | 7/2003 | Avila et al. |
| 2004/0102957 | A1 | 5/2004 | Levin |
| 2004/0210844 | A1 | 10/2004 | Pettinati et al. |
| 2006/0018442 | A1 * | 1/2006 | Evans et al. ............... 379/88.14 |
| 2007/0217586 | A1 * | 9/2007 | Marti et al. ............ 379/201.01 |

FOREIGN PATENT DOCUMENTS

KR        20040079631        9/2004

OTHER PUBLICATIONS

Unknown, "DictoMail voicemail to text messaging for SnapperMail," printed from http://www.dictomail.com/partner/snapper, printed on Dec. 29, 2005, 2 pages, U.S.A.

(Continued)

*Primary Examiner*—Fan Tsang
*Assistant Examiner*—Akelaw A Teshale
(74) *Attorney, Agent, or Firm*—Senniger Powers LLP (57) ABSTRACT

Improved systems and methods are provided for transcribing audio files of voice mails sent over a unified messaging system. Customized grammars specific to a voice mail recipient are created and utilized to transcribe a received voice mail by comparing the audio file to commonly utilized words, names, acronyms, and phrases used by the recipient. Key elements are identified from the resulting text transcription to aid the recipient in processing received voice mails based on the significant content contained in the voice mail.

18 Claims, 7 Drawing Sheets

OTHER PUBLICATIONS

Unknown, SpinVox Automatically Converts Voicemail to Text Messages, printed from http://www.engadget.com/2005/03/07/spinvox-automatically-converts-voicemail-to-text-messages, printed on Dec. 29, 2005, Engadget, LLC, 5 pages, U.S.A.

Unknown, "Vocal Link to Use Lucent Technologies' Speech Technology in Cross Media Messaging," printed from http://www.lucent.com/press/1100/001113.blb.html, 2005, Lucent Technologies, 2 pages, U.S.A.

Unknown, "Phonewire Introduces Phonetic Voicemail to Text Transcription Technology Upgrade," printed from http://pdfserver.emediawire.com/pdfdownload/304961/pr.pdf, printed on Dec. 29, 2005, Yahoo! Inc., 1 page, U.S.A.

\* cited by examiner

```
Voice Message - Microsoft Internet Explorer                              _ □ ×
File  Edit  View  Favorites  Tools  Help
← Back ▼ → ▼ ⌧ ⌕ ⌂   Address C:\voicemail\VM200101.SPH.wav.xml.html    ▼ → Go
```

From: "Arcadia"
To: "Bob"
Subject: "The industry solutions lab opened health hope him Bill Chung had..."

🔊 Voice message (1 min 4 seconds). Key information:

| | | |
|---|---|---|
| ■ | about | "The industry solutions lab opened health hope him Bill Chung had..."; "The spot said that he's very busy today and the keys..." |
| | phone numbers | "8637785" ☎; "8637785" ☎ |
| | action items | "8637785"; "Could you give me a call please and let me know"; "If you can the number is 8637785" |
| | date and time | today 📅 ("Earlier today"); today 📅 ("Today"); +1 day from today 📅 ("Tomorrow"); Friday 📅 ("On friday") |

```
|0:00                                                              1:04|
▶ ◉ ◎ ◉ 🔊 ━━━━○━━━━━━━━━━━━━━━━━━━
``` click to hide automatic transcript

Bob hello it's Arcadia:

8637785 Flights like to your does and Steve last, uh, talked to, um, Bob I had a phone mail message from Bob Kelly old, uh earlier today, um, I had contacted build shown going to help to say out to do this the best lotus notes mailing to all Watson employees about the industry solutions lab opened health hope him Bill Chung had suggested that I contact Bob Kaliow (?) about the spot said that he's very busy today and the keys them off site tomorrow and out on friday, uh, so I'm calling you to find out if there's somebody else in your organization who might be able to to help us so, um, and send out this this mailing tool like to the employees to them, uh, hopefully to have the text ready to make some time or briefcase that tomorrow. Anyway, um, if you could. Could you give me a call please and let me know? If, um, if you could help us out with this. If you can the number is 8637785

Thanks bye bye.

PERSONALIZED USER SPECIFIC GRAMMARS

BACKGROUND

Unified messaging systems commonly include an integration of various communications technologies such as email, voice mail, fax, and the like into a single service. Voice mails are typically received in a recipient's inbox as audio file attachments to an email. However, the nature of an audio file attachment is such that a recipient receiving a voice mail cannot simply determine the contents of the voice mail by viewing the audio file. Neither can a recipient identify which voice mail attachments are more important than others.

Speech-to-text software can be utilized to convert voice mail audio files into text files that can be visually read by a recipient. By processing an audio file through a speech-to-text module, a textual representation, such as a body of an email, or a file can be created that may be viewed by a recipient on a computer screen, a personal data assistant (PDA) screen, and the like. However, to be effective, speech-to-text software must address very complex variations in the audio file in order to determine the correct word that matches a vocal utterance. Due to variations in the voice utilized by a sender, speech-to-text transcription does not always result in accurate results. Furthermore, words or acronyms that may be commonly spoken in a group of people or a profession may not be recognized by the speech-to-text module. Thus, a text file of a voice mail audio file may contain unintelligible sentences or characters that cause the text file to be difficult to read and frustrate the benefits of a unified messaging system.

SUMMARY

One or more deficiencies of the known art are overcome by improved methods of transcribing voice mail messages into a text file by utilizing customized grammars that are specific to a recipient, a sender, a group of people within an organization, layers of personnel hierarchy within an organization, and the like, and by identifying and extracting key phrases within the voice mail messages.

In one aspect, a computer-implemented method and system is provided that uses custom grammars of extracted commonly utilized words, names, acronyms, and phrases of individuals or groups of individuals within a unified messaging system. The custom grammars can then be referenced when a text file is being transcribed from a voice mail audio file in order to improve the accuracy of the text file.

In another aspect, key elements contained in the audio file are extracted from the text file and included as a part of an email sent to the recipient. The key elements can then be used to highlight significant information in the voice mail and enable the recipient to determine its importance relative to other emails and voice mails in the recipient's inbox.

Alternatively, the invention may comprise various other methods and apparatuses.

Other features will be in part apparent and in part pointed out hereinafter.

BRIEF DESCRIPTION OF THE DRAWINGS

FIG. 4 is an exemplary screen shot of one embodiment of a message containing key elements, text transcription, and an audio file.

Corresponding reference characters indicate corresponding parts throughout the drawings.

DETAILED DESCRIPTION

Figure 1:
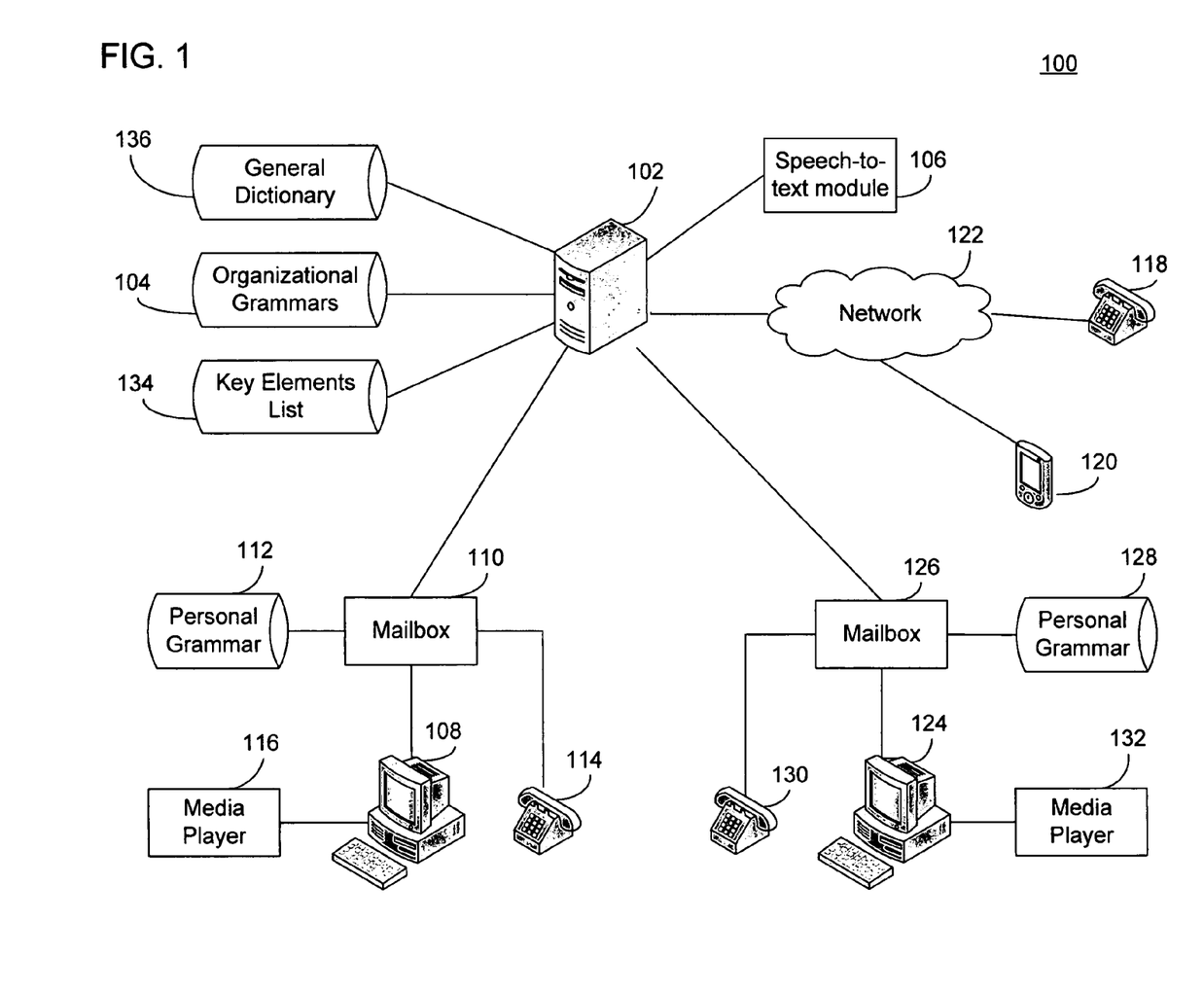
FIG. 1 is block diagram illustrating an exemplary system of the present invention.

Referring first to FIG. 1, a block diagram illustrates an exemplary embodiment of a system in which one embodiment of the present invention may be implemented. A system 100 has unified messaging server 102, organizational grammar 104, speech-to-text module 106, computer 108, mailbox 110, personal grammar 112, telephone 114, media player 116, outside telephone 118, remote computing device 120, network 122, second computer 124, second mailbox 126, second personal grammar 128, second telephone 130, second media player 132, key elements list 134, and general dictionary 136.

In one embodiment, a telephone call is made by a caller (e.g., a voice mail sender) from either second telephone 130, outside computing device 120, or outside telephone 118 to a recipient (e.g., a callee) having mailbox 110 that is a part of a unified messaging system. A voice mail message is recorded and saved as an audio file. Server 102 executes speech-to-text module 106 that creates a text transcript of the voice mail utilizing general dictionary 136 to resolve words, names, acronyms, and phrases uttered in the audio file. Key elements in the text transcript are identified that are present on key elements list 134. A message (e.g., an email) containing the identified key elements, the text transcript of the voice mail, and the audio file of the voice mail is sent to the recipient's mailbox 110. The recipient may view the key elements or the text transcript contained in the email on the screen of computer 108, or alternatively, from the screen of a remote computing device 120. The recipient may also listen to the voice mail audio file by executing media player 116 from computer 108.

In one embodiment, the accuracy of the transcribed voice mail can be improved through utilizing personal grammars that are specific to the recipient of the voice mail in addition to general dictionary 136. The data contained in personal grammar 112 are obtained from software executed by server 102 that accesses unified messaging system user mailboxes and mines data from information contained in the recipient's electronic-mail (email) inbox, voice mail inbox, telephone call logs, email directory, telephone directory, contacts list, appointments calendar, organizational charts, and the like (hereinafter collectively referred to as "mailbox," "mailbox 110," "mailbox 126," "recipient's mailbox," and "voice mail sender's mailbox"). The personal grammar thus contains words, names, acronyms, and phrases that are commonly used by the recipient or contained in documents received by the recipient. Since personal grammar 112 contains data that is commonly utilized by the recipient, the personal grammar data is given more weight than general dictionary 136 when an utterance is being resolved by speech-to-text module 106. Utilizing personal grammar 112 therefore can result in a more accurate transcription of the voice mail than when general dictionary 136 alone is utilized to transcribe the voice mail.

The information mined to create a custom grammar, such as personal grammar 112, can be structured so that it is useful for other application purposes. For example, the frequency of hits and source of the data can be used to develop an ad-hoc relationship maps between people that are sending and receiving email in the unified messaging system. The single relationship map for a particular user can be aggregated into a group relationship map. These relationship maps can be used in other applications such as those around social networks.

When creating a custom grammar, software mining data from a mailbox should differentiate names from words; store full names in a custom grammar; determine the frequency of occurrence of names; determine if data is located in a header line of a message and on which header line the data was located; identify an age index for each data regarding whether the data is recent or old; determine potential relationship links between items (e.g., which names appear together? how often? can a network be built between the names?). While not specifically required to create a functioning custom grammar, the above points can result in increasing the custom grammar's usefulness and versatility.

In one example, server 102 executes speech-to-text module 106 that creates a text transcript of the voice mail. Server 102 accesses general dictionary 136 and personal grammar 112 to resolve utterances in the audio file. Key elements in the text transcript are also identified that are contained on key elements list 134. An email containing key elements and text transcript of the voice mail and an audio file attachment of the voice mail is sent to the recipient's mailbox 110. The recipient may view the key elements or the text transcript contained in the email on the screen of computer 108, or alternatively, from the screen of a remote computing device 120. The recipient may also listen to the voice mail audio file attachment by executing media player 116 from computer 108 or by phoning in to the system.

Key elements can contain words or phrases that are determined to significant such as names, telephone numbers, dates, time, "Would you . . . ", "Please call . . . ", "Meeting at . . . ", and the like. Key elements list 134 contains words, phrases, and numeric format (e.g., a series of numbers that could be a phone number) and the like that is utilized in identifying matching key elements that are present in the voice mail. Words and phrases may be added to key elements list 134 that are to be identified in text transcript of a voice mail as the importance such words or phrases are determined by an organization.

The key elements of the text can be highlighted in the email to permit the recipient to preview the subject matter of the voice mail in order to determine its relative importance. In one example, the key elements can be provided as a subject line or header line of the email. In another example, the key elements can be provided in a prominent location in the email, such as the top of the email body to allow a recipient to quickly identify the subject matter of the voice mail.

In one embodiment, the key elements can be linked to the location of the voice mail audio file to permit the recipient to quickly playback the portion of the voice mail that contains the key element.

Words that are not recognized by speech-to-text module 106 can be transcribed as symbols or strings that are used as placeholders to indicate that a word was not able to be transcribed or has a lower likelihood of being an accurate transcription. An example of such a symbol or string can include an ellipse (e.g., ". . ."), a blank line (e.g., "______"), and the like. In one embodiment, a threshold can be set relating to the probably accuracy of the transcription, wherein if the probable transcription accuracy falls below the threshold, the ellipse or blank line would be inserted in the transcription. For example, if the probability that a transcribed word is an accurate match is 80% or below, a ellipse or blank line is inserted in the text transcription. Thus, instead of populating the transcribed text with garbled or nonsensical text that can make the overall message difficult to read, a text transcription of a voice mail can contain words that have a high degree of accuracy and placeholders for unrecognized words. A recipient reading the transcribed text can then quickly fill in the placeholders with correct words, names, acronyms, or phrases in light of the context of the overall voice mail message.

Figure 2:
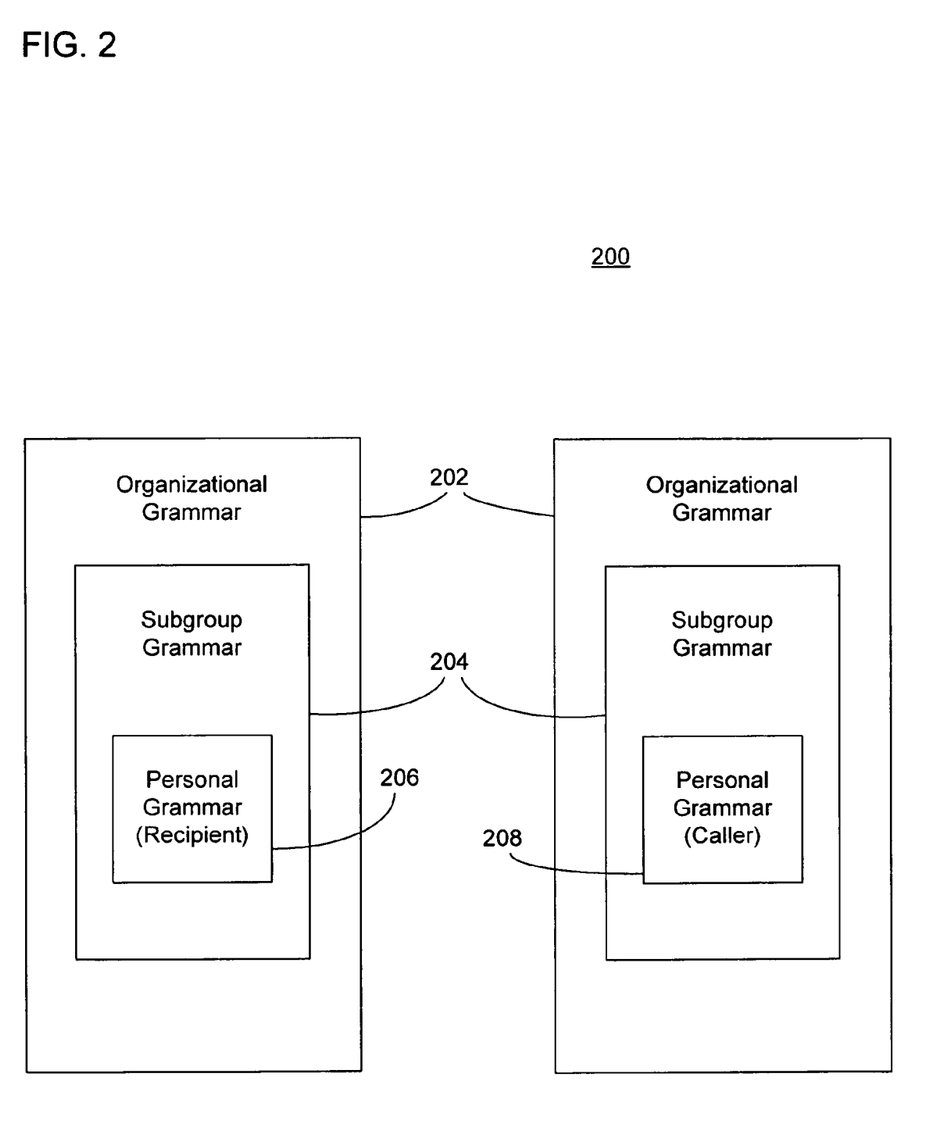
FIG. 2 is a block diagram illustrating exemplary customized grammars and the interrelationship between the grammars.

Relationships may be established between two or more grammars in the transcription of a voice mail audio file to improve the accuracy of the voice mail transcription. For example, in addition to utilizing personal grammar 112 or 128, (e.g., personal grammar (recipient) 206 and personal grammar (caller) 208, respectively), to accurately transcribe audio files, other grammars may be utilized in combination with personal grammar 112 to resolve voice mail audio files, such as an organizational grammar 104 that contains words, acronyms, and phrases that are commonly used within an organization. Grammars containing words, acronyms, and phrases used by subgroups or teams of people within an organization may also be created, for example subgroup grammar 204, and utilized in combination with other grammars or dictionaries in the speech-to-text transcription process.

FIG. 2 is a block diagram illustrating exemplary customized grammars 200 and the interrelationship between the grammars. An organizational grammar 104 (e.g., organizational grammar 202) may be automatically created by mining inboxes and documents across an organization. Alternatively or in addition, a software company may create or modify (the organizational grammar 104 for words, acronyms, and phrases identified from data present in unified messaging system mailboxes of individuals throughout the organization. Similarly, a subgroup working on a specific project within the organization, for example, a unified messaging systems team, may have words, names, acronyms, and phrases that are unique to its subgroup. Thus, a subgroup grammar 204 can be created and used to transcribe audio files of voice mails that are received by members of the subgroup. Like personal grammars, software executed by server 102 can access unified messaging system mailboxes of individuals that are identified as being members of a particular subgroup and mine words from information contained in the subgroup member's mailboxes to create subgroup grammars. As illustrated in FIG. 2, organizational grammar 202 and subgroup grammar 204 are common between the recipient and the caller, indicating that both individuals work for the same company and within the same subgroup. Personal grammar (recipient) 206 and personal grammar (caller) 208 are unique to the individuals, being created from data mined from each individual's mailbox. Thus, the combination of multiple related grammars can improve transcription of voice mail by improving recognition of words, names, acronyms, or phrases that may be common between the caller and recipient of the voice mail.

Examples of additional grammars that can be created, in addition to personal grammar 112, include grammars created that contain data that are commonly found in other mailboxes on a common unified messaging system in which mailbox 110 is located. Other examples of grammars include words commonly located in mailboxes having a common security clearance within a unified messaging system. By utilizing two or more grammars that have some relationship to the recipient of an email, the accuracy of the transcribed voice mail audio file can be improved. Grammars may also be established organizationally for levels of supervision hierarchy. For example, in addition to personal grammar 112, grammars may be created for common terms utilized by individuals on the same supervisory level as that associated with the owner of personal grammar 112 (e.g., a manager, senior manager, director, and the like). Alternatively, grammars may be established for two or more levels above and below the supervision level of the owner of personal grammar 112. Thus, by combining personal grammar 112 and a grammar established for two levels of supervision above and below that of the owner of personal grammar 112, words commonly utilized by people who are either supervised by or supervise the owner of personal grammar 112 can be utilized to transcribe voice mails received by the voice mail recipient. Alternatively or in addition, a grammar may be created in whole or in part from documents outside of the inbox. For example, project documents from a sharepoint site could be mined to create a workgroup grammar.

In addition to organizational, subgroup, hierarchical, common unified messaging systems, common security clearance, and personal grammars, grammars specific to an occupation (e.g., medical, legal, construction, manufacturing, and the like), can be utilized to improve the accuracy of text transcriptions of audio files.

In another embodiment, the accuracy of transcribing voice mail audio files can be further improved by utilizing a two or more personal grammars that are related to a voice mail sender and recipient to accurately resolve the voice mail. In one example of this embodiment, a voice mail sender calling from phone 130 associated with the sender's mailbox 126 records a voice mail for a recipient associated with mailbox 110. Server 102 executes speech-to-text module 106 that creates a text transcript of the voice mail. Server 102 accesses personal grammar 112 and personal grammar 128 to resolve utterances in the audio file that are commonly used by the voice mail recipient or sender. Personal grammar 112 and personal grammar 128 contain words, names, acronyms, and phrases that are commonly used by both the voice mail sender and voice mail recipient or contained in documents located in their respective mailboxes (e.g., electronic-mail (email) inbox, voice mail inbox, telephone call logs, email directory, telephone directory, contacts list, appointments calendar, organizational charts, and the like). As described above, key elements in the text transcript are also identified that are contained on key elements list 134. An email containing key elements and text transcript of the voice mail and an audio file attachment of the voice mail is sent to the recipient's mailbox 110.

Figure 3:
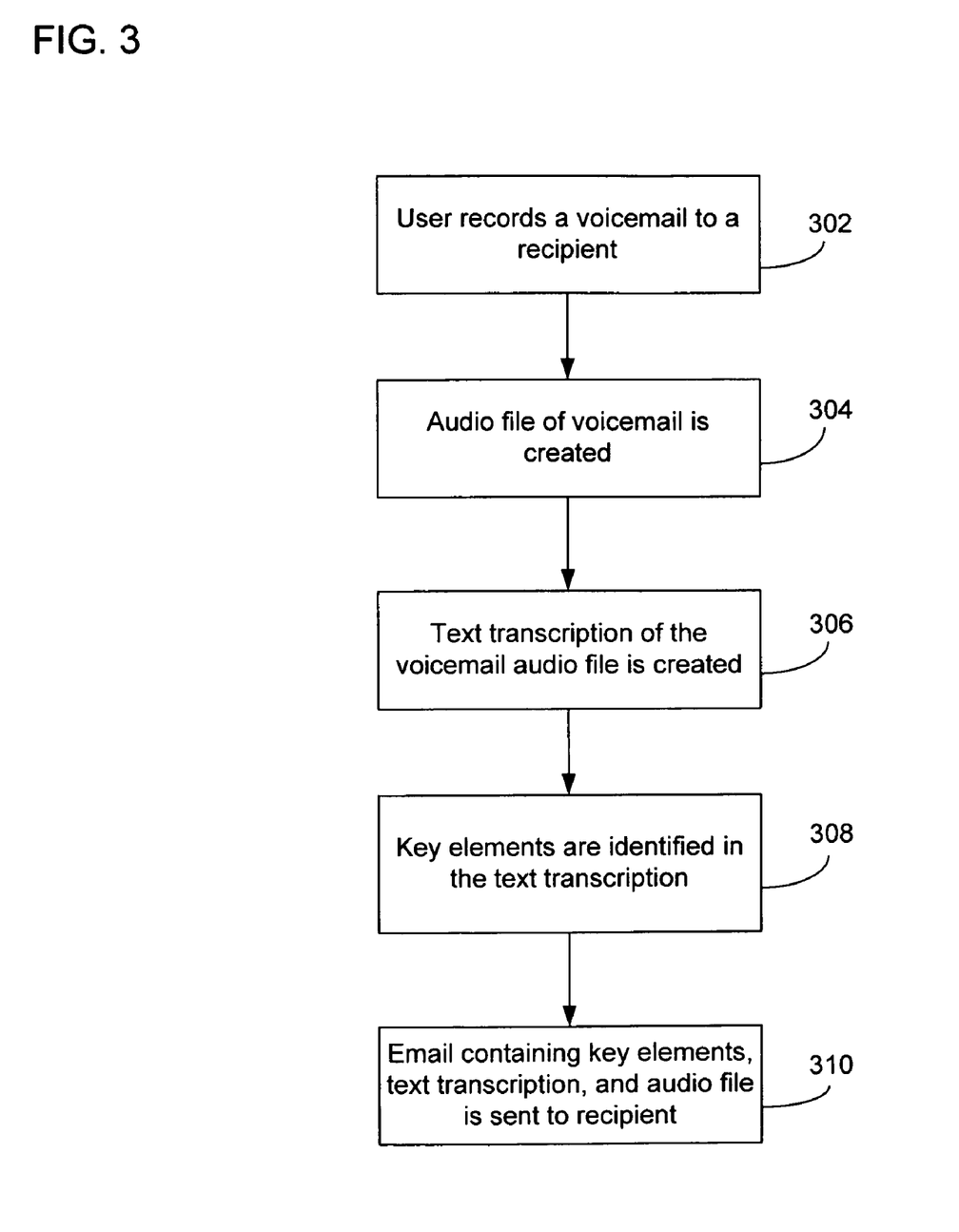
FIG. 3 is a flowchart illustrating an exemplary method of one embodiment of the present invention.

FIG. 3 is a flowchart illustrating an exemplary method of one embodiment of the present invention. The method is initiated at 302 when a caller records a voice mail to a recipient having mailbox 110 on a unified messaging system 100. An audio file of the voice mail is created at 304. Speech-to-text module 106 creates a text transcription of the voice mail audio file at 306 by comparing the utterances present in the audio file with recipient's personal grammar 112 and determining the correct text transcription for the spoken utterance. At 308, key elements are identified in the text transcription that are contained on key elements list 134. A message is created and sent to a recipient at 310 that contains identified key elements present in the text transcription of the voice mail audio file, the text transcription of the voice mail audio file, and the audio file of the voice mail.

In another embodiment, the identified key elements are hyperlinked to their location in the audio file of the voice mail. The recipient can then activate the hyperlink to playback the portion of the voice mail that contains the key element. This is significant in the event that transcribed text adjacent to the key element is either unable to be transcribed (e.g., contains an ellipse or blank line placeholder), the probability that a transcribed word is an accurate match is below an accuracy threshold (e.g., in numbers, the numbers fifty (50) and fifteen (15) are can be mistranscribed due to their phonetic similarity), or an error in the transcription occurred resulting in a nonsensical statement preceding or following the key element. Thus, the recipient can quickly go to the most important part of the voice mail and listen to the message the sender recorded without being required to listen to the entire voice mail.

The key elements can be either highlighted in the text transcription, reproduced in a separate location in the message, for example at the top of the body of the message or in the subject line of the email message, or both. The text of the key elements can also be color-coded or the highlighting can be color-coded to further aid the recipient to quickly identify and categorize the key elements of the voice mail. For example, the text surrounding the word "about" may be identified as a subject matter category. Text surrounding the phrases, "could you give me . . . " or "if you can . . . " can be surrounded by text identifying an action item being requested from the recipient. Numeric values of a specific format can be categorized as phone numbers. Words and phrases such as, "today," "earlier today," "later today," "tomorrow," "Friday," "April," and the like can identify scheduled times that are being requested or established. The key phrases can be grouped together by category to permit the recipient an quick organized format from which to determine the subject matter of the voice mail and any action items or scheduled items that are identified. FIG. 4 is an exemplary screen shot of one embodiment of a message containing key elements, text transcription, and an audio file, wherein the key elements have been highlighted in the text transcription, grouped into categories, and hyperlinked to the audio file of the voice mail. It is also contemplated that the user may edit and/or correct the transcription and have the text to speech engine learn from the user correction. In one embodiment, a computer-readable medium is provided on which a data structure is stored. The data structure comprises a first field of a text file of a transcribed audio file of a voice mail and a second field of key elements identified from the text file that are contained in the key elements list 136.

Figure 5:
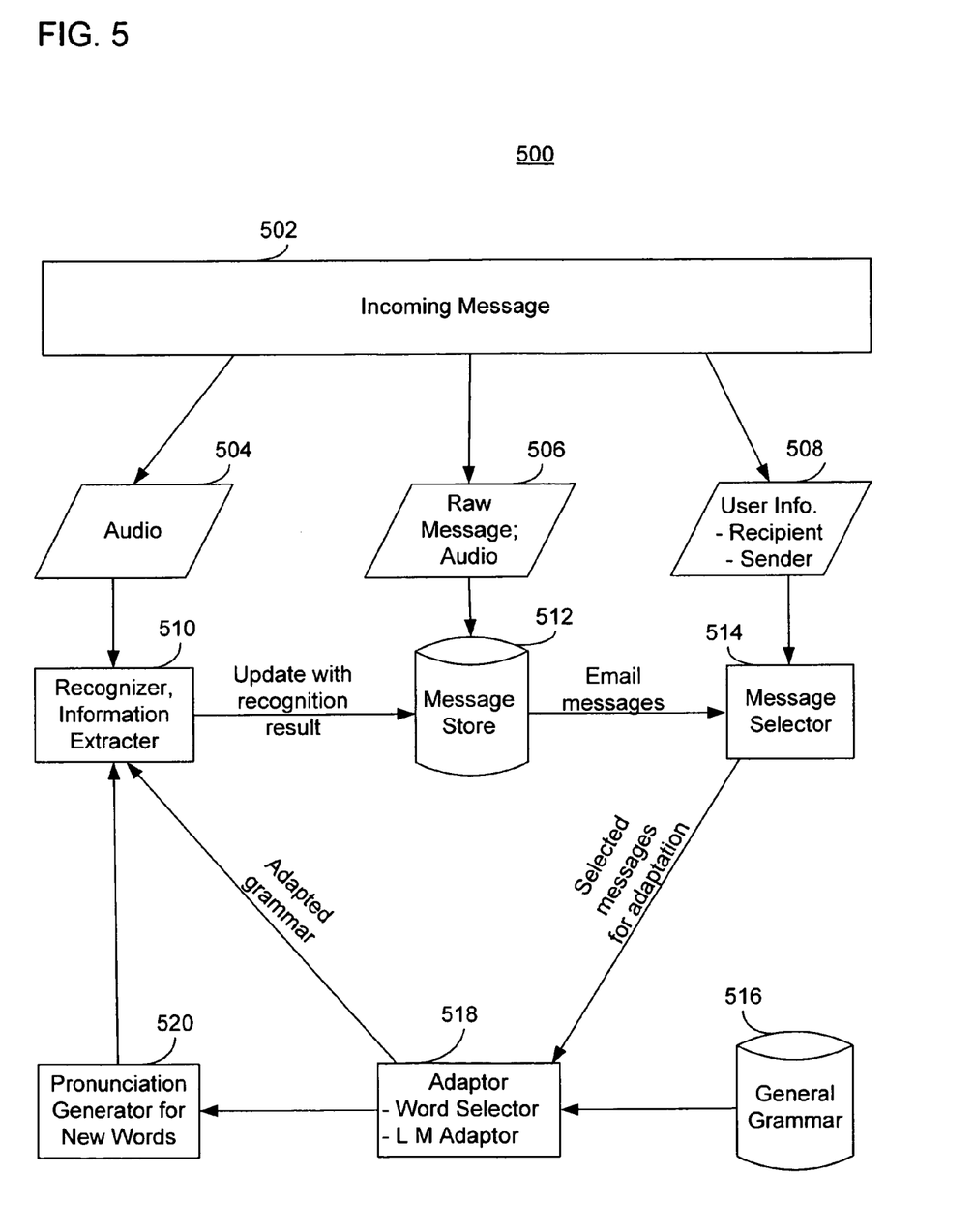
FIG. 5 is block diagram illustrating an exemplary system of the present invention wherein an incoming email is processed.

FIG. 5 is block diagram illustrating an exemplary system of the present invention wherein an incoming email is processed.

Figure 6:
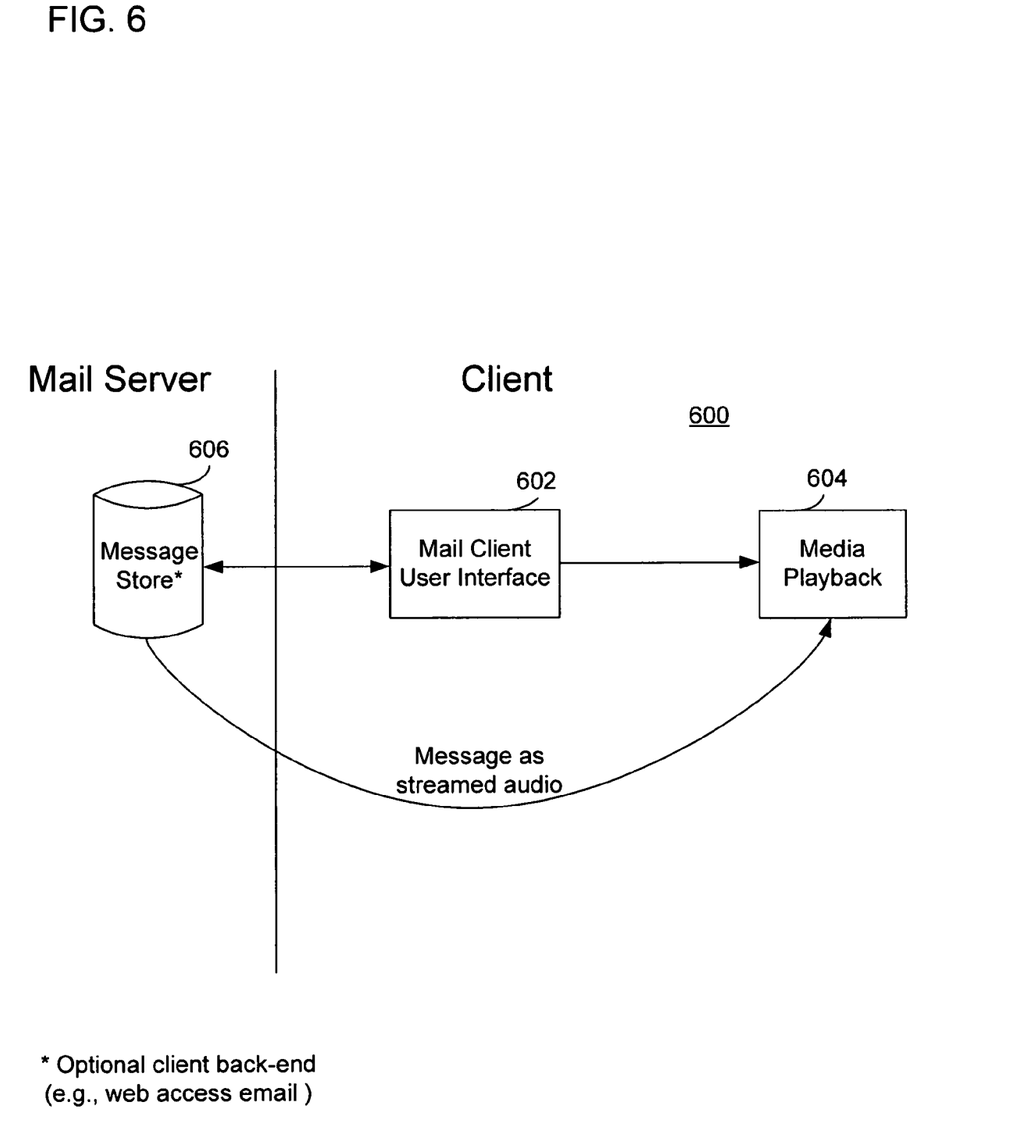
FIG. 6 is block diagram illustrating an exemplary system of the present invention wherein playback of a voice mail audio file is being requested by a recipient.

FIG. 6 is block diagram illustrating an exemplary system of the present invention wherein playback of a voice mail audio file is being requested by a recipient. The recipient either activates the audio file from a computing device networked to a unified messaging system Mail Client User Interface 602, or from a remote computing device accessing a unified messaging system through an optional back-end web access email program, such as Outlook Web Access (Microsoft Corp., Redmond, Wash.). A recipient operating a computer networked to a unified messaging system Mail Client User Interface 602 opens an email containing key elements, a text transcript, and an audio file of a voice mail that was sent to the recipient. The recipient can activate the audio file contained in the email which causes media player 116 to launch on the recipient's computer. Media player 116 plays back the audio file of the voice mail that was sent to the recipient (Media Playback 604). Alternatively, the recipient can activate a hyperlink of a key element that was identified in the text transcription of the audio file. Media player 116 is launched and the portion of the audio file containing the key element is played back on media player (Media Playback 604).

Alternatively, a recipient that remotely accesses an email containing key elements, a text transcript, and an audio file of a voice mail from a back-end email client, such as Outlook Web Access. The recipient can activate the audio file contained in the email which causes media player 116 to launch on the recipient's remote computer. Media player 116 plays back a streamed audio file of the voice mail that was sent to the recipient (Media Playback 604). Alternatively, the recipient can activate a hyperlink of a key element that was identified in the text transcription of the audio file. Media player 116 is launched and the portion of the audio file containing the key element is played back on media player via streamed audio (Media Playback 604).

Figure 7:
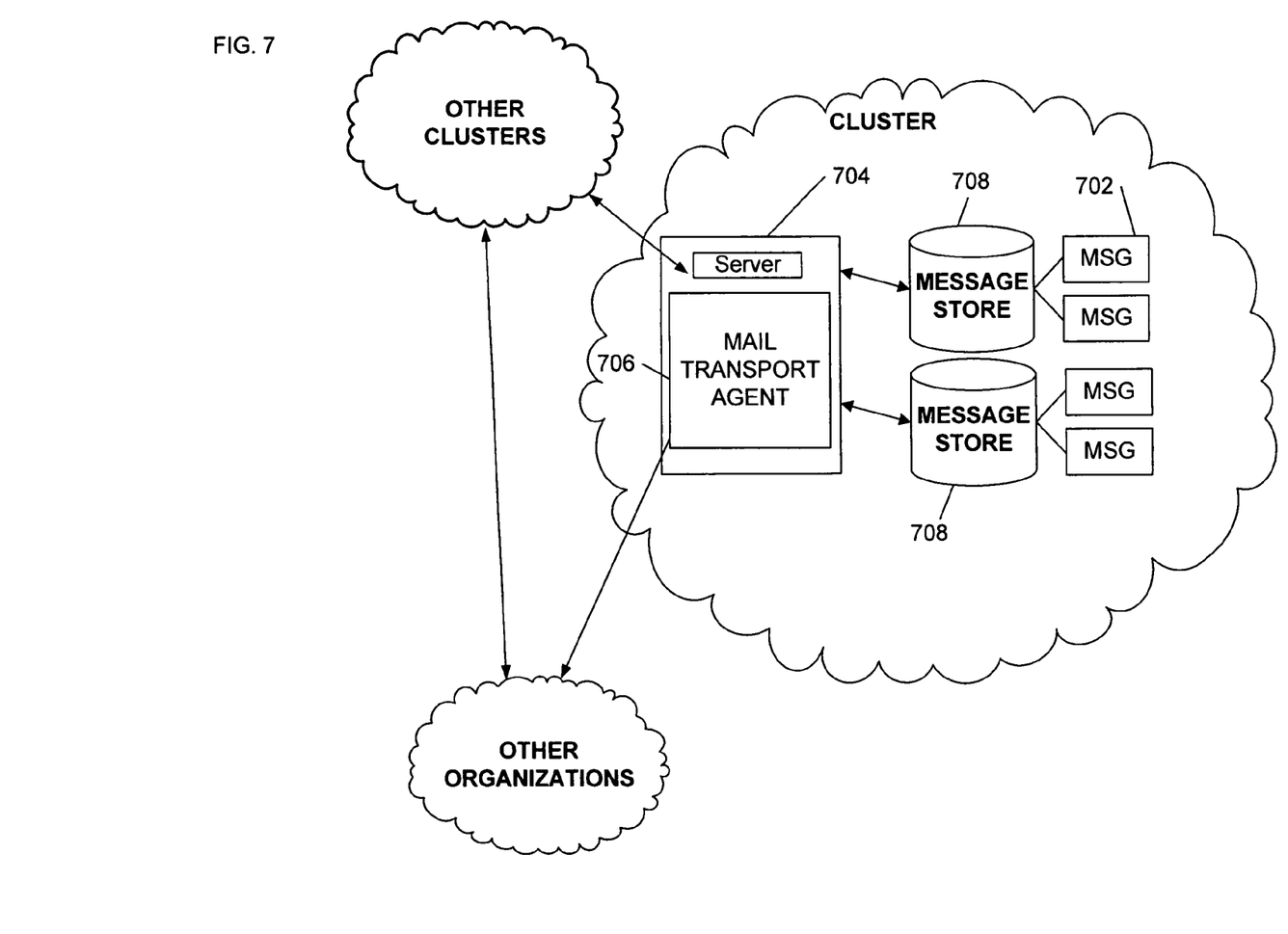
FIG. 7 is a block diagram illustrating one example of a suitable computing system environment in which the invention may be implemented.

As illustrated in FIG. 7, one embodiment of an operating environment of an embodiment of the invention includes various clusters and organizations that are transmitting messages such as mail therebetween. Reference character 702 illustrates one embodiment of an exemplary cluster. Cluster 702 includes a server 704 having an executable mail transport 706 for sending and receiving mail to and from other clusters and organizations. In addition, the mail transport agent 706 sends and receives mail to various message stores 708. Messages created within the cluster or delivered to the cluster are stored in the message store 708.

The server 704 typically has at least some form of computer readable media. Computer readable media, which include both volatile and nonvolatile media, removable and non-removable media, may be any available medium that may be accessed by server 704. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by server 704. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The server 704 typically has some form of system memory including computer storage media in the form of removable and/or non-removable, volatile and/or nonvolatile memory. In the illustrated embodiment, system memory includes read only memory (ROM) and random access memory (RAM).

The server 704 may operate in a networked environment using logical connections to one or more remote computers, such as a remote computer. The remote computer may be a personal computer, a server, a router, a network PC, a peer device or other common network node, and typically includes many or all of the elements described above relative to server 704. The logical connections depicted in FIG. 7 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet). Additionally, server 704 may be connected to a public or telephone switching system (not shown) that enables users inside and outside an organization to place calls to each other and record voice messages to recipients that are connected to a unified messaging system.

When used in a local area networking environment, server 704 is connected to the LAN through a network interface or adapter. When used in a wide area networking environment, server 704 typically includes a modem or other means for establishing communications over the WAN, such as the Internet. The modem, which may be internal or external, is connected to system bus via the user input interface, or other appropriate mechanism. In a networked environment, program modules depicted relative to server 704, or portions thereof, may be stored in a remote memory storage device (not shown). By way of example, and not limitation, FIG. 7 illustrates remote application programs as residing on the memory device. The network connections shown are exemplary and other means of establishing a communications link between the computers may be used.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, server 704 executes computer-executable instructions such as those illustrated in the figures to implement aspects of the invention.

The following examples further illustrate the invention.

EXAMPLE 1

When voice mail messages are submitted to a unified messaging system they arrive as audio attachments. By its nature an audio file is relatively opaque; one can not look a computer screen and see the contents of the audio or get a preview of the most important elements in the audio. The present invention provides a text preview of the audio in a unified messaging voice mail and extracts and highlights key elements from the audio such as names, phone numbers, etc. Once extracted the text of the message has the following benefits:

- It allows the voice mail recipient to have a text preview of the audio in the voice mail. In a public setting, the recipient does not have to playback the message on the speakers of the computing device on or call in to voice mail to hear the message. Privacy is therefore greatly increased.
- The preview can allow quick triaging of voice mail to determine which voice messages are urgent and important
- The text can be indexed and searched allowing better management of voice messages within the bigger context of the inbox.
- Important elements of the audio such as names and phone numbers can be called out and highlighted in the message and stored in specific message properties.

Speech-to-text translation is a very complex technical process that does not provide 100% accurate results. The present invention provides techniques by which less than perfect state of the technology can be shaped into an acceptable user experience for voice mail. The processes and systems of the present invention refine the accuracy of the speech-to-text translation by use of the information in a user's mailbox and potentially information in other mailboxes to create a customized grammar for transcribing a voice mail audio file that is very specific to the unified messaging system user and the type of voice mail the user might get.

When a caller records a voice message using the unified messaging system, such as Exchange (Microsoft Corp., Redmond, Wash.), an audio attachment is created and attached to an email message that is submitted through the Exchange transport for delivery to the Exchange inbox. This invention passes the audio through a speech-to-text translation module that creates a text preview of the body of the voice message and also attempts to extract key text elements (names, phone numbers, etc) from the voice message. Once the text body preview and the key text elements are extracted they are stored as part of the message. The body preview can be placed in the body of the voice mail message while key text elements can be included in the body or in custom email properties.

Speech-to-text translation of the audio is currently a very inaccurate process due to the state of the speech recognition technology and the breadth of the grammar that the recognition engine must support. Rather than provide a body preview of the message that is full of inaccurate results, an enhancement to the user experience is to use placeholders for words where confidence is low (e.g., an ellipse ". . .", a text marker "[Untranscribed text]", blank lines "______", and the like). The assumption that underlies this idea is that is it easier for the human brain "fill in the blanks" than it is for the brain to correct mistaken words jumbled together with correct words. This is technique is necessary because less than 60% accuracy in speech-to-text translation can make the result very difficult to understand and can lead to the perception that software is buggy.

Part of what makes speech-to-text transcription hard is the huge universe of words that could match the spoken utterance. Most speech-to-text transcription tries to solve this problem using a general dictionary. The general dictionary can be enhanced using words that are more specifically weighted for the user based on content in their inbox (in email conversations, etc). Moving beyond this, a workgroup or company grammar could be built from mining words from a collection of inboxes. Since Exchange is a server it is able to access user inboxes and create these types of cross person grammars if necessary.

The personal grammar (e.g., mailbox data) and organizational grammar can be used to enhance speech-to-text translation by providing a more focused dictionary for translation. With the personal grammar, words and names that are commonly used in communication with a specific user will be more easily translated. The personal grammar is created from information contained in the individual's unified messaging system mailbox. The personal grammars are created and stored in mailboxes across the system. For a particular voice message a grammar for that message can be created from the union of the personal grammars of both the Caller and the recipient (assuming that the caller is also in the system.

Using the organizational grammar, words that are most commonly used in the organization will be more easily translated. It is easy to see how in, for example, a company operating in the medical industry, this might be an important enhancement. Personal and organizational grammars, once created, are used in conjunction with a more general dictionary to aid in speech-to-text translation, but more weight is given to the custom grammars in matching results. The grammar, once built, can be stored in the mailbox so that it is available and associated with the user.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A computer-implemented method for improved transcription to a text file of an audio file of a voice mail message to a recipient in a unified messaging system comprising a grammar and a key elements list, the method comprising:
comparing each voice mail utterance on the audio file to the grammar;
determining one or more voice mail utterances as recognizable based on a threshold relating to a probability accuracy of said comparing;
transcribing each of said recognizable voice mail utterances into a text corresponding to each said recognizable voice mail utterance, wherein the plurality of texts comprise a text file;
determining one or more voice mail utterances as unrecognizable based on a threshold relating to a probability accuracy of said comparing;
representing each of said unrecognizable voice mail utterances as a symbol or string added to the text file; and
including with the text file an identification of key elements in the texts in the text file that are contained in the key elements list.

2. The computer-implemented method of claim 1, wherein the grammar is a personal grammar and wherein the personal grammar is specific to the recipient based on at least one of electronic-mail (email) inbox, voice mail inbox, telephone call logs, email directory, telephone directory, contacts list, appointments calendar, organizational charts of the recipient and documents specific to an individual.

3. The computer-implemented method of claim 1, wherein the grammar is a personal grammar and the unified messaging system further comprising a second grammar, wherein the combination of the personal grammar and the second grammar are used to transcribe the audio file to a text file.

4. The computer-implemented method of claim 3, wherein the second grammar is selected from the group consisting of voice mail sender personal grammars, subgroup grammars, hierarchical grammars, common unified messaging system grammars, common security clearance grammars, organizational grammars, and occupational grammars.

5. The computer-implemented method of claim 1, wherein a message is sent to the recipient comprising the identified key elements, the transcribed text, and the voice mail audio file.

6. The computer-implemented method of claim 5, wherein an identified key element is provided in a subject line or header line of the message.

7. The computer-implemented method of claim 5, wherein the identified key elements are grouped into categories.

8. The computer-implemented method of claim 7, wherein the categories are selected from the group consisting of subject matter, action item, phone numbers, and scheduled times.

9. The computer-implemented method of claim 5, wherein each key element in the message is hyperlinked to an audio file location within the voice mail audio file in the message where the key element is uttered.

10. The computer-implemented method of claim 9, further comprising:
activating the key element hyperlink to playback the utterance of the key element in the voice mail audio file.

11. The method of claim 1, wherein one or more computer-readable media have computer-executable instructions for performing the computer-executable method of claim 1.

12. A system for transcribing an audio file voice mail that is sent to a recipient connected to a unified messaging system, comprising:
a grammar containing data from the unified messaging system mailbox of the recipient;
a key elements list containing data that is to be located in a voice mail;
a server being configured to execute computer-executable instructions for:
executing a speech-to-text module that compares each voice mail utterance on the audio file to the grammar;
creating a text corresponding to each recognizable voice mail utterance, wherein the plurality of texts comprise a text transcription;
determining one or more utterances in the audio file as unrecognizable based on a threshold relating to a probability accuracy of said comparing, said determining further comprising representing each of said unrecognizable utterances as a symbol or string in a corresponding position within the text transcription;
identifying key elements contained in the text transcription that are contained in the key elements list, said identified key elements corresponding to only the recognizable voice mail utterances from which a text has been created; and
sending the recipient an email containing the identified key elements, the text transcription, and the audio file.

13. The system of claim 12, wherein the grammar is a personal grammar and wherein the speech-to-text module transcribes the audio file based on the personal grammar and at least one additional grammar.

14. The system of claim 13, wherein the additional grammar is selected from the group consisting of voice mail sender personal grammars, subgroup grammars, hierarchical grammars, common unified messaging system grammars, common security clearance grammars, organizational grammars, and occupational grammars.

15. The system of claim 12, wherein the key elements identified in the email are hyperlinked to the audio file location of the key elements.

16. The system of claim 15, further comprising:
a computing device connected to a unified messaging system and having access to the recipient's mailbox, the computing device being configured to execute a media player in response to activation of a key element hyperlink.

17. The system of claim 12, wherein the identified key elements are organized in categories in the email.

18. The system of claim 17, wherein the categories are selected from the group consisting of subject matter, action item, phone numbers, and scheduled times, and wherein the key elements contained in the email are color coded according to their categories.

* * * * *